United States Patent [19]
Gellert

[11] Patent Number: 6,079,972
[45] Date of Patent: Jun. 27, 2000

[54] INJECTION MOLDING COOLING CORE HAVING SPIRAL GROOVES

[76] Inventor: Jobst Ulrich Gellert, 7A Prince Street, Georgetown, Ontario, Canada, L7G 2X1

[21] Appl. No.: 09/218,637

[22] Filed: Dec. 22, 1998

[30] Foreign Application Priority Data

Dec. 7, 1998 [CA] Canada ................................ 2255798

[51] Int. Cl.⁷ .................................................. B29C 45/73
[52] U.S. Cl. ...................................... 425/552; 264/328.16
[58] Field of Search ................................. 425/526, 547, 425/549, 552; 264/328.16

[56] References Cited

U.S. PATENT DOCUMENTS

| | | | |
|---|---|---|---|
| 4,054,630 | 10/1977 | Wang | 425/526 |
| 4,622,001 | 11/1986 | Bright et al. | 425/552 |
| 4,759,708 | 7/1988 | Hestehave et al. | 425/526 |
| 5,094,603 | 3/1992 | Gellert . | |
| 5,498,150 | 3/1996 | Check . | |

OTHER PUBLICATIONS

Mold–Masters Brochure entitled "Introducing Master–Stack Closure Molding Components" no date.

*Primary Examiner*—Tim Heitbrink
*Attorney, Agent, or Firm*—Dalesman & Company

[57] ABSTRACT

Injection molding apparatus with each elongated cooled mold core (10) having a hollow elongated inner part (78) inside a hollow elongated outer part (80) and an integral dome shaped front cap (132). The outer surface (120) of the inner part (78) and the inner surface (126) of the outer part (80) each having cooling fluid conveying grooves (122, 128) which spiral in opposite direction. This provides very uniform cooling and forces the cooling fluid flow through the grooves (122, 128) to be very turbulent which increases cooling efficiency. It also gives the mold cores (10) additional structural strength to withstand higher injection pressures.

3 Claims, 5 Drawing Sheets

INJECTION MOLDING COOLING CORE HAVING SPIRAL GROOVES

BACKGROUND OF THE INVENTION

This invention relates generally to hot runner injection molding and particularly to injection molding apparatus having an improved mold core.

Cooling the mold cores of hot runner injection molding systems to reduce cycle time is well known. Reducing cycle time by even a fraction of a second is very important in large volume applications such as making beverage bottle preforms. As seen in U.S. Pat. No. 5,094,603 to the applicant which issued Mar. 10, 1992, this has normally been done by circulating cooling water through and around a central cooling tube in the mold core. While this arrangement is satisfactory for many applications, it generally does not provide sufficient cooling. Another problem with the central cooling tube is that if it is not precisely centered or there is any other reason for uneven cooling of the melt in the cavity, the uneven cooling will produce uneven forces in the cavity which can shift the core. This results in the preform not having uniform wall thickness which causes problems in the blowing of the preform.

U.S. Pat. No. 5,498,150 to Check which issued Mar. 12, 1996 does show a mold core having an outer part with longitudinally extending grooves therein. While this does increase the cooling surface area, there is still a considerable delay waiting for the melt to solidify before the mold can be opened for ejection. Also, as the mold core forms a part of the cavity, it must have sufficient structural strength to withstand injection pressures of up to 10,000 psi and this limits the size of the cooling water conduits. Furthermore, the flow of cooling water through the mold core is generally laminar which reduces the efficiency of cooling of the melt. Mold-Masters brochure entitled "Introducing Master-Stack Closure Molding Components" shows a mold core having cooling fluid bores extending radially outward in the head. This is suitable for molding closures but not for molding preforms.

SUMMARY OF THE INVENTION

Accordingly, it is an object of the present invention to at least partially overcome the disadvantages of the prior art by providing an integral mold core having additional structural strength and increased cooling efficiency due to turbulent flow of the cooling fluid therethrough.

To this end, in one of its aspects, the invention provides injection molding apparatus having an elongated cavity in a mold and a cooled mold core made of a hollow elongated inner part, an elongated outer part, and a front cap having an inner surface and an outer surface. The elongated inner part has a front portion with an open front end, an outer surface and a longitudinally extending central duct to convey cooling fluid therethrough. The elongated outer part has a front portion with an open front end, an outer surface, and an inner surface which fits around the outer surface of the front portion of the inner part. At least one of the inner surface of the front portion of the elongated outer part and the outer surface of the front portion of the elongated inner part has a number of cooling fluid conveying grooves extending longitudinally therein. Also the outer surface of the outer part and the outer surface of the front cap form an inner side of the cavity. The front portion of the elongated inner part, the front portion of the elongated outer part and the front cap are integrally joined together. The front cap encloses the open front end of the front portion of the outer part to form a cooling fluid conveying space extending between the central duct in the front portion of the inner part and the cooling fluid conveying grooves. Both the outer surface of the front portion of the inner part and the inner surface of the front portion of the outer part have cooling fluid conveying grooves therein. The grooves in the outer surface of the front portion of the inner part and the grooves in the inner surface of the front portion of the outer part spiral in opposite directions to produce turbulent cooling fluid flow through the grooves.

Further objects and advantages of the invention will appear from the following description taken together with the accompanying drawings.

DETAILED DESCRIPTION OF THE INVENTION

Figure 1:
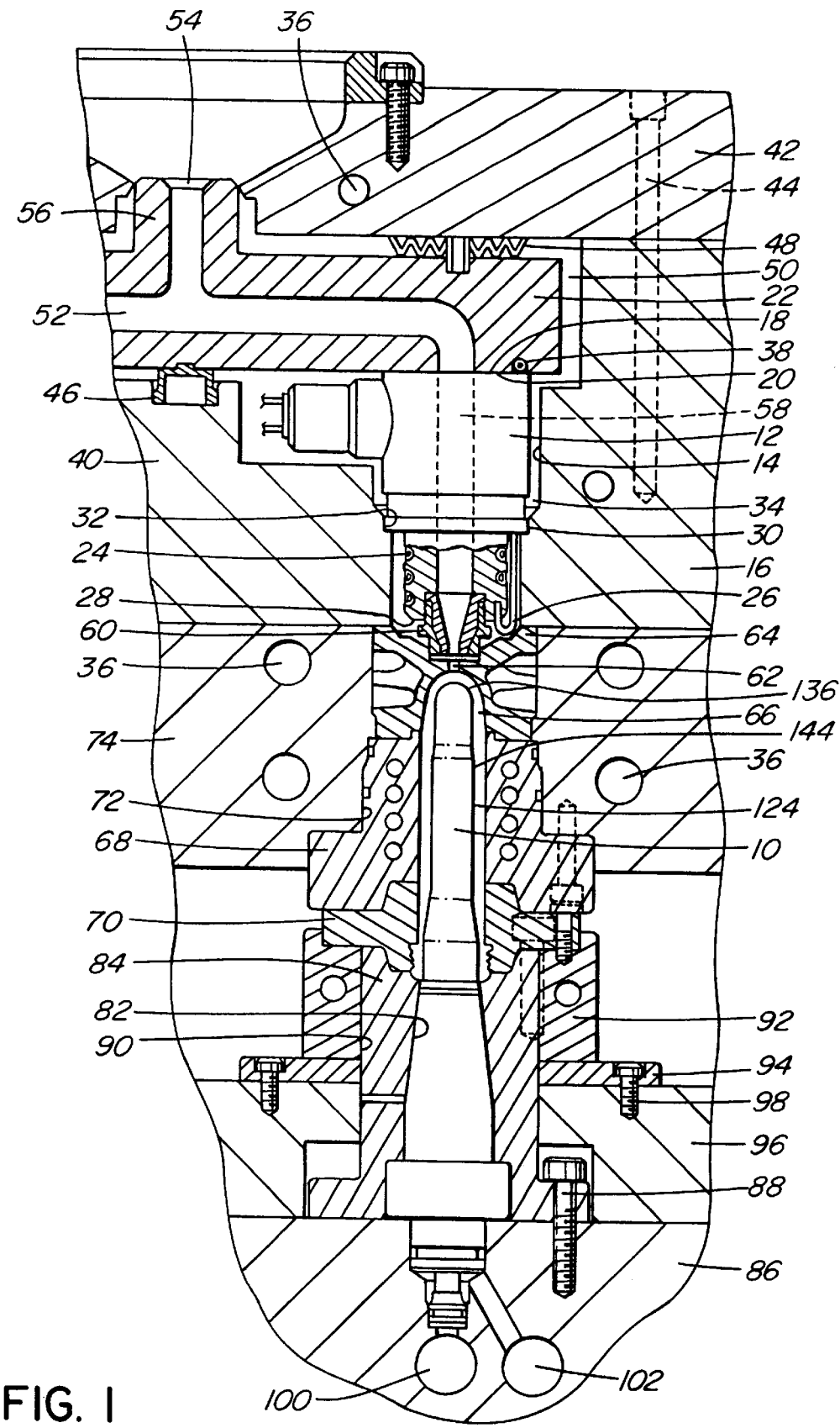
FIG. 1 is a sectional view showing a portion of a multi-cavity injection molding system having a cooled mold core according to a preferred embodiment of the invention.
Figure 2:
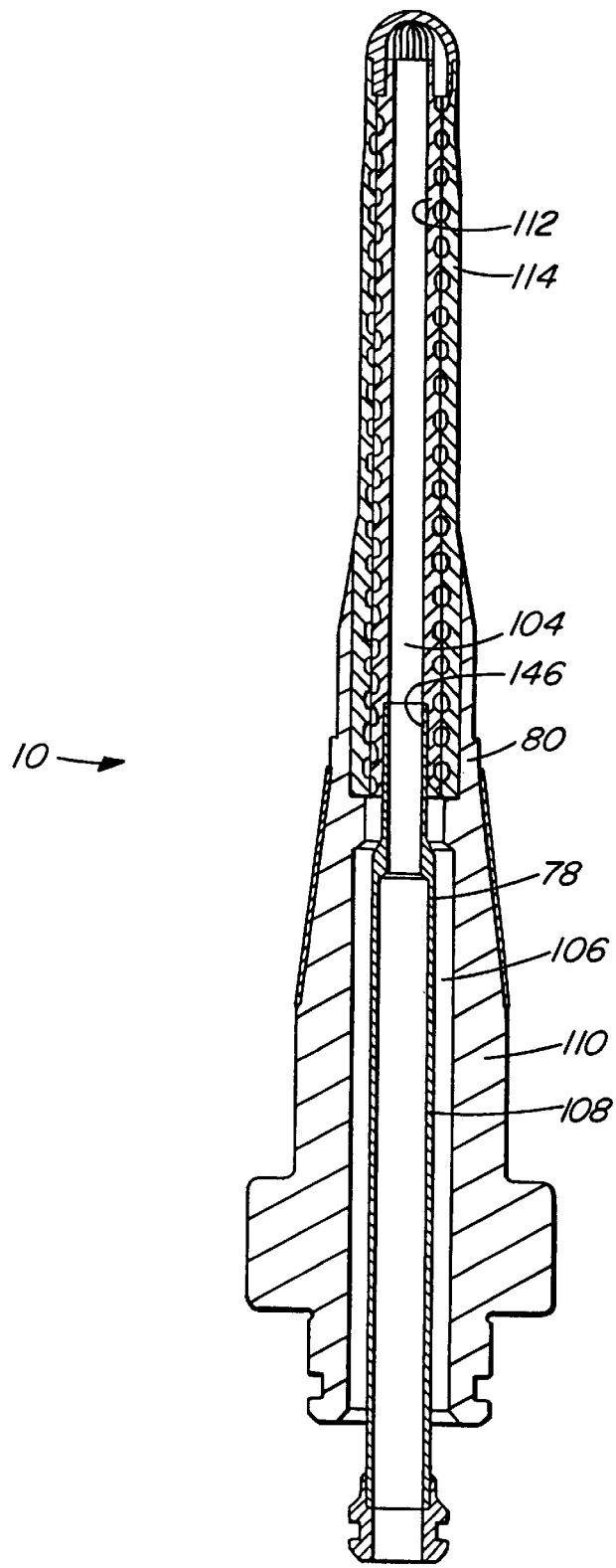
FIG. 2 is a sectional view of the mold core seen in FIG. 1.

Reference is first made to FIGS. 1 and 2 which shows a portion of a multi-cavity injection molding system or apparatus used for molding beverage bottle preforms having a cooled mold core 10 according to a preferred embodiment of the invention. In this configuration, a number of heated nozzles 12 are mounted in openings 14 in a mold 16 with the rear end 18 of each heated nozzle 12 abutting against the front face 20 of a steel melt distribution manifold 22. Each nozzle 12 is heated by an integral electrical heating element 24 and has a thermocouple element 26 extending into its front end 28 to monitor and control the operating temperature. Each heated nozzle 12 has a cylindrical locating flange 30 seated in a circular locating seat 32 in the opening 14. This provides an insulative air space 34 between the heated nozzle 12 and the surrounding mold 16, which is cooled by pumping cooling water through cooling conduits 36.

The melt distribution manifold 22 is also heated by an integral electrical heating element 38. The melt distribution manifold 22 is mounted between a manifold plate 40 and a clamp plate 42 which are secured together by bolts 44. The melt distribution manifold 22 is located by a central locating ring 46 and a number of resilient spacers 48 which provide an insulative air space 50 between it and the surrounding cooled mold 16.

A melt passage 52 extends from a central inlet 54 in an inlet portion 56 of the melt distribution manifold 22 and branches in the melt distribution manifold 22 to extend through a central melt bore 58 in each of the heated nozzles 12. The melt passage 52 extends through a two-piece nozzle seal 60 aligned with a gate 62 extending through a cooled gate insert 64 to a cavity 66. This cavity 66 for making beverage bottle preforms extends between a cavity insert 68 and thread split inserts 70 on the outside and the cooled mold core 10 according to the invention on the inside. The gate insert 64 and the cavity insert 68 are seated in an opening 72 in a cavity plate 74 through which cooling water lines (not shown) extend to the cooled gate insert 64.

As can be seen, the cooled mold core 10 according to this embodiment of the invention has a hollow elongated inner part 78 which fits inside a hollow elongated outer part 80. The mold core 10 extends rearwardly from the cavity 66 through an opening 82 in a core lock member 84 which is secured to a core backing plate 86 by screws 88. The core lock member 84 extends through an opening 90 in a slide member 92 and a wear plate 94 which is secured to a stripper plate 96 by screws 98. Cooling fluid supply and return lines 100, 102 extend in the core backing plate 86 and are connected respectively to a longitudinally extending central duct 104 in the inner part 78 and an outer cooling fluid duct 106 extending between a rear portion 108 of the inner part 78 and a rear portion 110 of the outer part 80. Of course, in other applications, the mold 16 can have different numbers and shapes of parts and plates depending upon the configuration required.

Figure 3:
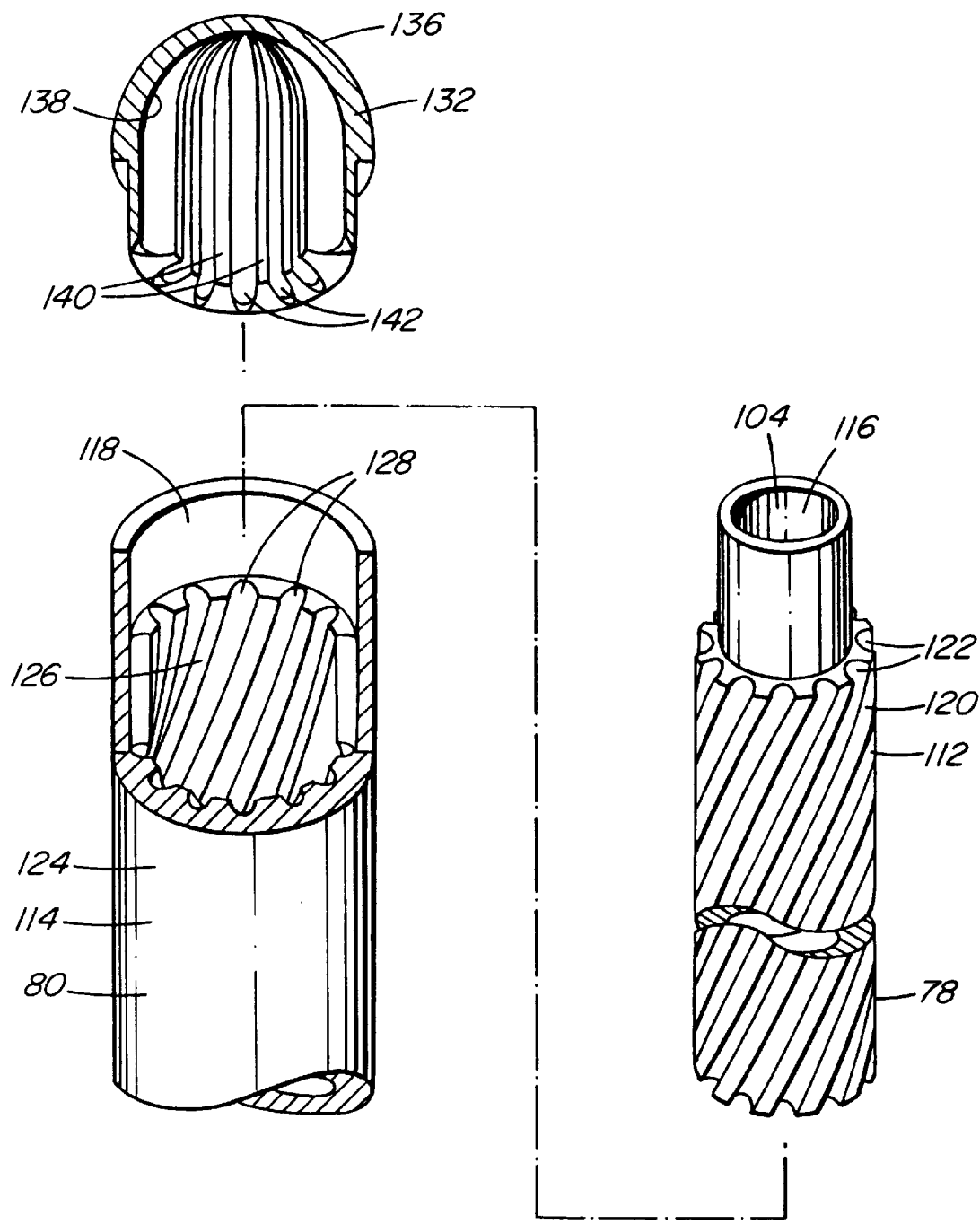
FIG. 3 is an isometric view of part of the front portions of an inner part and an outer part showing the spiral grooves, and a front cap in position for assembly to form the mold core seen in FIG. 2.
Figure 4:
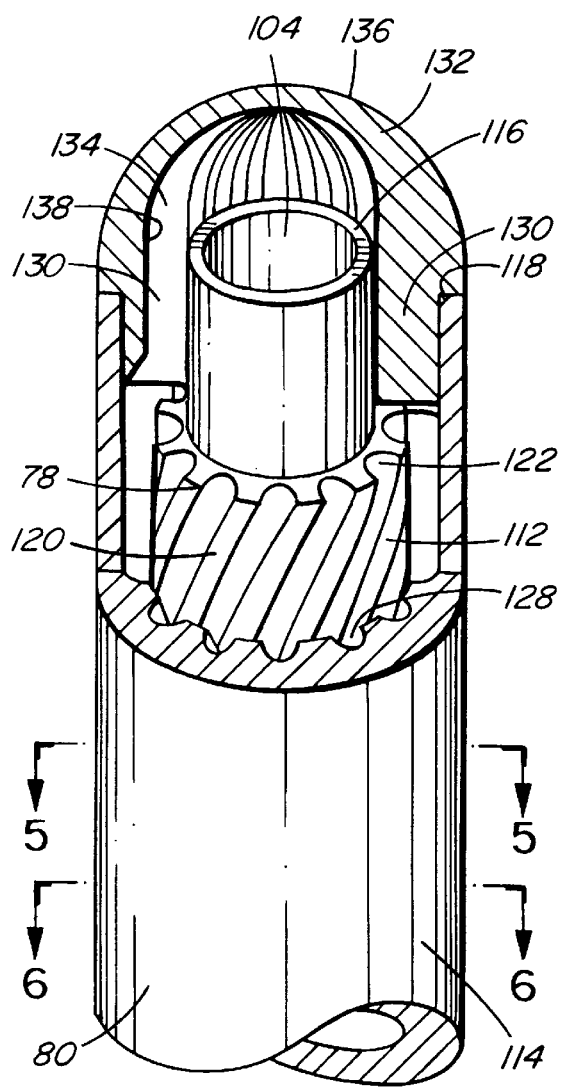
FIG. 4 is cut-away isometric view of part of the integral front portions of the same mold core.
Figure 5:
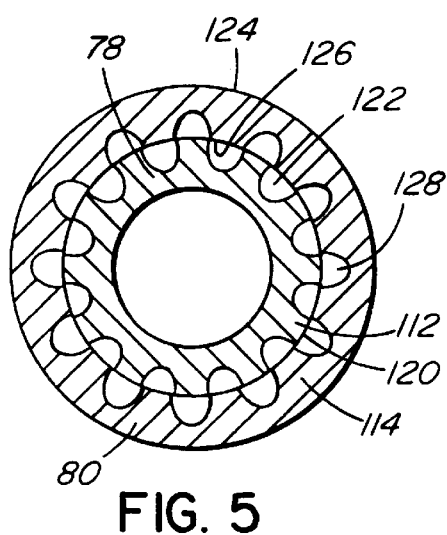
FIG. 5 is a sectional view taken along line 55 in FIG. 4.
Figure 6:
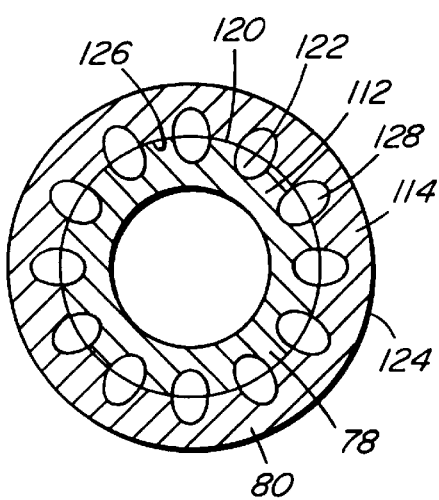
FIG. 6 is a sectional view taken along line 66 in FIG. 4.

Reference is now also made to FIGS. 3 and 4 in describing the cooled mold core 10 according to this embodiment of the invention. The inner part 78 and the outer part 80 have front portions 112, 114 with open front ends 116, 118. The front portion 112 of the inner part 78 with the central cooling fluid duct 104 extending therethrough has an outer surface 120 with spiral grooves 122 extending therearound. The front portion 114 of the outer part 80 has an outer surface 124 and an inner surface 126 which fits around the outer surface 120 of the front portion 112 of the inner part 78. The inner surface 126 of the front portion 114 of the outer part 80 also has spiral grooves 128 extending therearound, but they spiral in the opposite direction to the spiral grooves 122 in the outer surface 120 of the front portion 112 of the inner part 78.

As can best be seen in FIG. 3, the spiral grooves 128 in the outer surface 120 of the front portion 112 of the inner part 78 and the spiral grooves 128 in the inner surface 126 of the front portion 114 of the outer part 80 stop a short distance from the open front ends 116, 118. Thus, as seen in FIG. 4, when the inner part 78 is inserted into the outer part 80, a U-shaped circular channel 130 is formed between the open front ends 116, 118 to receive a dome shaped front cap 132. The dome shaped front cap 132 encloses the open front end 118 of the outer part 80 and provides a cooling fluid conveying space 134 to convey cooling fluid from the central duct 104 in the inner part 78 to the spiral grooves 122, 128 in the inner and outer parts 78, 80. The dome shaped front cap 132 has an outer surface 136 and inner surface 138 with a number of curved ribs 140 which form curved grooves 142 between them. The outer surface 124 of the front portion 114 of the outer part 80 and the outer surface 136 of the front cap 132 form an inner side 144 of the cavity 66. In this embodiment, the curved grooves 142 in the inner surface 138 of the front cap 132 are aligned with the spiral grooves 122 in the front portion 112 of the inner part 78 and the spiral grooves 128 in the front portion 114 of the outer part 80 to channel the cooling fluid from the central duct 104 in the inner part 78 into the spiral grooves 122, 128 in the inner and outer parts 78, 80.

Figure 7:
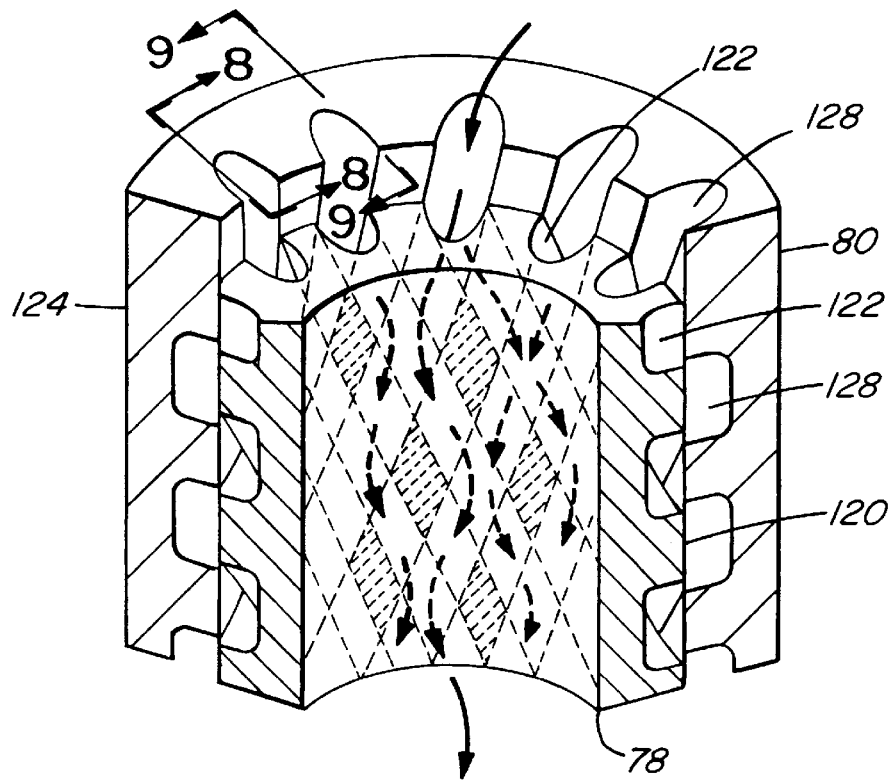
FIG. 7 is a cut-away isometric view of a portion of the cooled mold core showing the turbulent flow of the cooling fluid in the spiral grooves therein.
Figure 8:
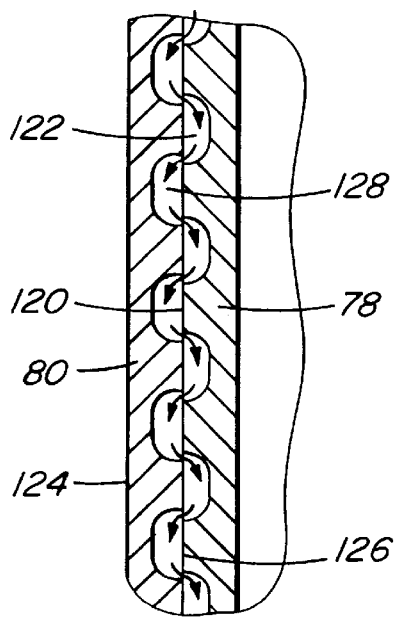
FIG. 8 is a sectional view taken along line 88 in FIG. 7.
Figure 9:
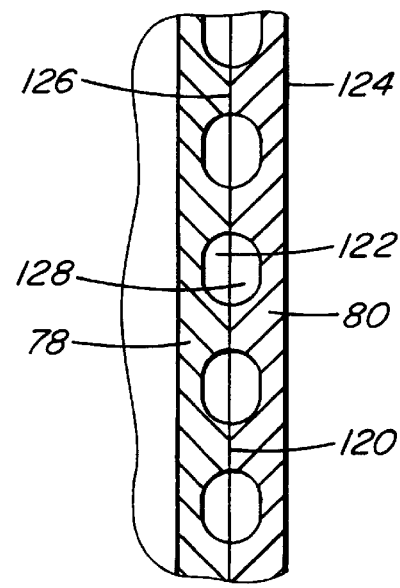
FIG. 9 is a sectional view taken along line 99 in FIG. 7.

The front portion 112 of the inner part 78, the front and rear portions 114, 110 of the outer part 80, and the dome shaped front cap 132 are assembled and integrally joined together by a suitable process such as brazing in a vacuum furnace or by hot isostatic pressing. In this embodiment, the rear portion 108 of the inner part 78 called a bubbler tube is press fitted into place with a sleeve portion 146 which fits inside the front portion 112 of the inner part 78. Integrally joining the front portion 112 of the inner part 78, the front and rear portions 114, 110 of the outer part 80 and the dome shaped front cap 132 together provides the cooled mold core 10 with more strength which allows the spiral grooves 128 in the outer part 80 to be closer to the cavity 66. It also ensures that the central cooling fluid duct 104 is precisely located in the center of the cooled mold core 10 and the spiral grooves 122, 128 extending in opposite directions ensures that the cooling fluid flow through them is very even. Both of these factors ensure that cooling to the melt in the cavity 66 is very uniform and not greater on one side than the other. As seen in FIGS. 7–9, the spiral grooves 122, 128 extending in opposite directions also forces the cooling fluid to flow both back and forth and in and out through the joined grooves 122, 128 resulting in very turbulent flow and more efficient cooling of the melt in the cavity 66.

In use, after the system has been assembled as shown in FIG. 1, electrical power is applied to the heating elements 24, 38 to heat the nozzles 12 and the melt distribution manifold 22 to a predetermined operating temperature. A suitable cooling fluid such as water is also circulated by pumps (not shown) through the cooling conduits 36 in the mold 16 and the lines leading to the cavity inserts 68. Usually a cleaner cooling fluid such as glycol is pumped in a closed loop cooling system through the supply and return lines 100, 102 to circulate through the mold cores 10. Pressurized melt from a molding machine (not shown) is then introduced according to a predetermined injection cycle into the central inlet 54 of the melt passage 52 of the melt distribution manifold 22, from where it flows through the central melt bore 58 in each of the heated nozzles 12 and the two-piece nozzle seals 60 and through the gates 62 to fill the cavities 66. After the cavities 66 are full, injection pressure is held momentarily to pack and then released. After a short cooling period, the mold 16 is opened to eject the product. After ejection, the mold 16 is closed and the injection pressure is reapplied to refill the cavity 66. This cycle is repeated continuously with a cycle time that has been reduced as a result of improved cooling from the mold core 10.

While the description of the cooled mold core 10 having grooves 122, 128 spiraling in opposite directions has been given with respect to a preferred embodiment, it will be evident that various other modifications are possible without departing from the scope of the invention as understood by those skilled in the art and as provided in the following claims.

The embodiments of the invention in which an exclusive property or privilege is claimed is defined as follows:

1. In an injection molding apparatus having an elongated cavity (66) in a mold (16) and a cooled mold core (10) made of a hollow elongated inner part (78), a hollow elongated outer part (80), and a front cap (132) having an inner surface (138) and an outer surface (136), the elongated inner part (78) having a front portion (112) with an open front end (116), an outer surface (120) and a longitudinally extending central duct (104) to convey cooling fluid therethrough, the elongated outer part (80) having a front portion (114) with an open front end (118), an outer surface (124), and an inner surface (126) which fits around the outer surface (120) of the front portion (112) of the inner part (78), at least one of the inner surface (126) of the front portion (114) of the elongated outer part (80) and the outer surface (120) of the front portion (112) of the elongated inner part (78) having a plurality of cooling fluid conveying grooves (122, 128) extending longitudinally therein, whereby the outer surface of the front portion (114) of the outer part (80) and the outer surface (136) of the front cap (132) form an inner side (126) of the cavity (66), the improvement wherein;

the front portion (112) of the elongated inner part (78), the front portion (114) of the elongated outer part (80) and the front cap (132) are integrally joined together whereby the front cap (132) encloses the open front end (118) of the front portion (114) of the outer part (80) to form a cooling fluid conveying space (134) extending between the central duct (104) in the inner part (78) and the cooling fluid conveying grooves (122, 128), and both the outer surface (120) of the front portion (112) of the inner part (78) and the inner surface (126) of the front portion (114) of the outer part (80) have a plurality of cooling fluid conveying grooves (122, 128) therein, the grooves (122) in the outer surface (120) of the front portion (112) of the inner part (78) and the grooves (128) in the inner surface (126) of the front portion (114) of the outer part (80) spiralling in opposite directions to produce turbulent cooling fluid flow through said grooves (122, 128).

2. An injection molding apparatus as claimed in claim 1 wherein the front cap (132) is dome shaped with an inner surface (138) having a plurality of curved ribs (140) which form a plurality of curved grooves (142) therebetween, the curved grooves (142) being aligned with at least one of the grooves (122) in the outer surface (120) of the front portion (112) of the inner part (78) of the mold core (10) and the grooves (128) in the inner surface (126) of the front portion (114) of the outer part (80) of the mold core (10).

3. An injection molding apparatus as claimed in claim 1 wherein the elongated inner part (78) of the cooled mold core (10) has a rear portion (108) through which the central duct (104) extends, the elongated outer part (80) of the cooled mold core (10) has a rear portion (110) with a central opening therethrough in which the rear portion (108) of the inner part (78) is received to form an outer cooling fluid duct (106) extending around the rear portion (108) of the inner part (78) rearwardly from the spiral grooves (122, 128), and the central duct (104) through the inner part (78) and the outer cooling fluid duct (106) extending around the rear portion (108) of the inner part (78) are connected to cooling fluid conduits (100, 102) to provide a continual flow of cooling fluid through the mold core 10.

* * * * *